(12) United States Patent
Chou

(10) Patent No.: US 6,565,381 B1
(45) Date of Patent: May 20, 2003

(54) PORTABLE BOOSTER BATTERY DEVICE

(76) Inventor: Wen San Chou, No. 1-25, Kang Wei Village, An Din Hsiang, Tainan Hsien (TW)

( * ) Notice: Subject to any disclaimer, the term of this patent is extended or adjusted under 35 U.S.C. 154(b) by 0 days.

(21) Appl. No.: 10/055,192

(22) Filed: Jan. 25, 2002

(51) Int. Cl.⁷ .............................................. H01R 13/72
(52) U.S. Cl. ......................... 439/501; 429/7; 429/100; 429/121
(58) Field of Search .............................. 429/7, 97, 100, 429/121, 161, 176, 178; 439/500, 501, 502, 503, 504, 505, 506, 522, 627, 726, 754, 952

(56) References Cited

U.S. PATENT DOCUMENTS

| | | | | |
|---|---|---|---|---|
| 2,718,540 A | * | 9/1955 | Betz ............................ | 429/96 |
| 5,793,185 A | * | 8/1998 | Prelec et al. ................. | 320/104 |
| 5,982,138 A | * | 11/1999 | Krieger ....................... | 320/105 |
| 6,002,235 A | * | 12/1999 | Clore .......................... | 320/105 |
| 6,155,870 A | * | 12/2000 | Valentine ..................... | 439/504 |
| 6,222,342 B1 | * | 4/2001 | Eggert et al. ................ | 320/105 |
| 6,356,050 B1 | * | 3/2002 | Hussaini ...................... | 320/105 |

* cited by examiner

*Primary Examiner*—Lynn D. Feild
*Assistant Examiner*—Thanh-Tam Le
(74) *Attorney, Agent, or Firm*—Charles E. Baxley

(57) ABSTRACT

A booster battery device includes one or more batteries disposed in a housing. Two arms are disposed on the sides of the housing and each having an upper stud and a lower rod and/or two middle bars secured to the housing, for forming a space between the arm and the stud and the rod and/or the bars. Two clips are electrically coupled to the battery with cables and each has two jaws for clasping onto the studs and for retaining the clips between the studs and the rods. The rods may retain the clips to the housing when the clips are disengaged from the studs inadvertently.

6 Claims, 5 Drawing Sheets

PORTABLE BOOSTER BATTERY DEVICE

BACKGROUND OF THE INVENTION

1. Field of the Invention

The present invention relates to a booster battery, and more particularly to a portable booster battery device.

2. Description of the Prior Art

Typical booster battery devices comprise a battery and two clips electrically coupled to the battery for electrically coupling to the battery of the vehicle or the like. U.S. Pat. No. 5,589,292 to Rozon discloses one of the typical portable booster battery devices and comprises a housing for receiving the battery, and two shields or covers attached to the housing for receiving the clips, and comprises two studs extended in the shields or covers. The clips are clamped onto the studs for storing purposes. However, the typical portable booster battery device has no protective device for preventing the clips from being disengaged from the housing after the clips are disengaged from the studs inadvertently. The clips may be shortaged and may generate sparks inadvertently when the clips are disengaged from the studs and when the clips are contacted with each other inadvertently.

The present invention has arisen to mitigate and/or obviate the afore-described disadvantages of the conventional booster battery devices.

SUMMARY OF THE INVENTION

The primary objective of the present invention is to provide a portable booster battery device including a protective structure for preventing the clips from being disengaged from the housing after the clips are disengaged from the studs inadvertently.

In accordance with one aspect of the invention, there is provided a booster battery device comprising a housing including two sides, at least one battery engaged in the housing, two arms provided on the sides of the housing respectively, and each including an upper portion having a stud extended toward and secured to the housing, and each including a lower portion having a rod extended toward and secured to the housing, for forming a space between the arm and the stud and the rod respectively, two cables each including a first end electrically coupled to the battery, and each including a second end, and two clips coupled to the second ends of the cables respectively, and each including a pair of jaws for clasping onto the studs respectively and for retaining the clips between the studs and the rods respectively, and for allowing the rods to support the clips when the clips are disengaged from the studs inadvertently.

The upper portions of the arms each includes a beam extended toward and secured to the housing, the studs are extended from the beams respectively.

The studs each includes at least one tooth provided thereon for allowing the clips to be stably clasped onto the studs.

The arms each includes a middle portion having a pair of spaced bars extended toward and secured to the housing, for further retaining and supporting the clips to the housing when the clips are disengaged from the studs inadvertently, the bars are spaced away from the studs for allowing a clasping of the jaws of the clips onto the studs to be seen through a gap formed between the bars and the studs.

The sides of the housing each includes a cable storage compartment provided therein for receiving the cables respectively. The cable storage compartments each includes a shank extended from the side of the housing, and a plate secured to the shank for forming and defining a peripheral chamber between the shank and the plate and for receiving the cables respectively.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
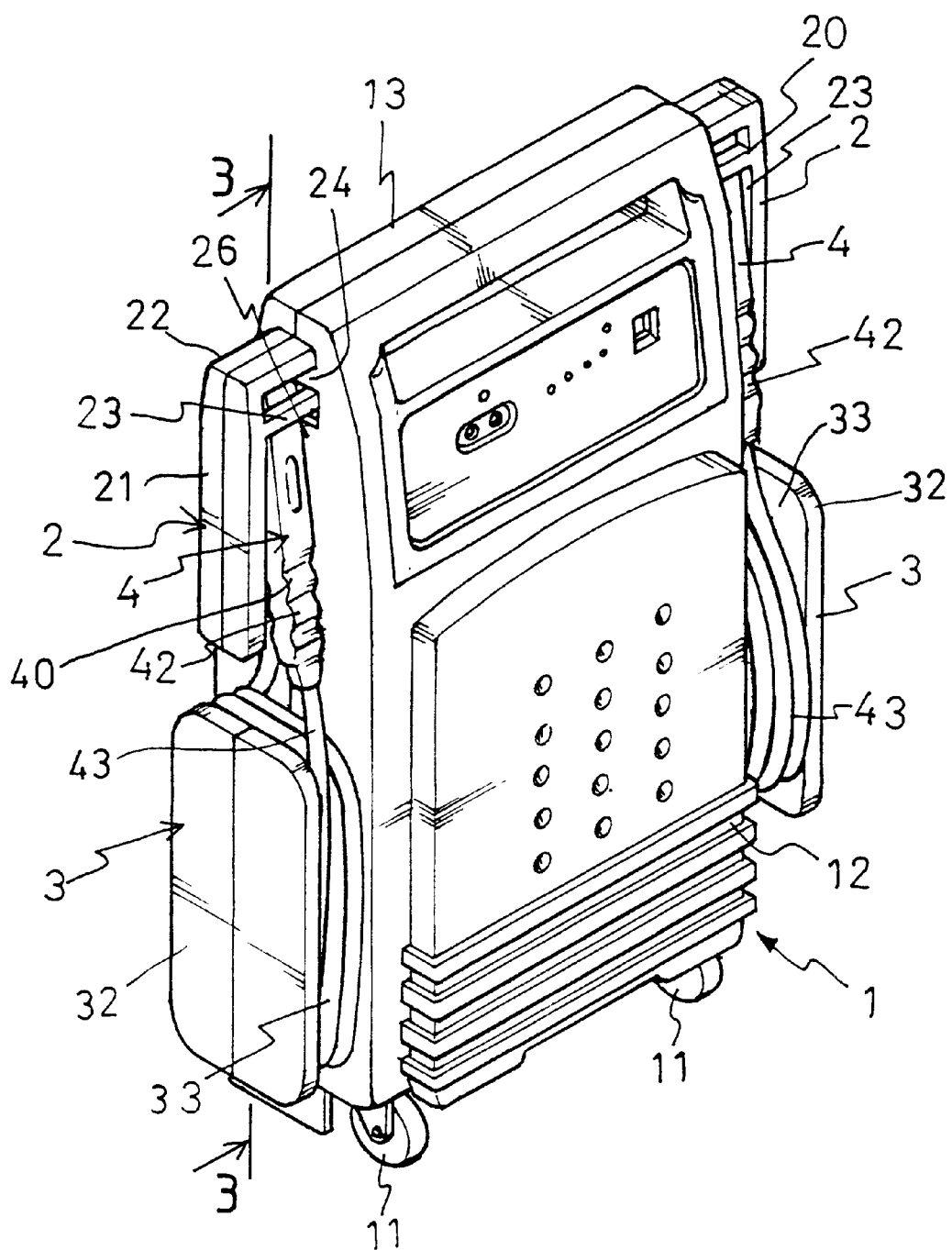
FIG. 1 is a perspective view of a portable booster battery device in accordance with the present invention.
Figure 2:
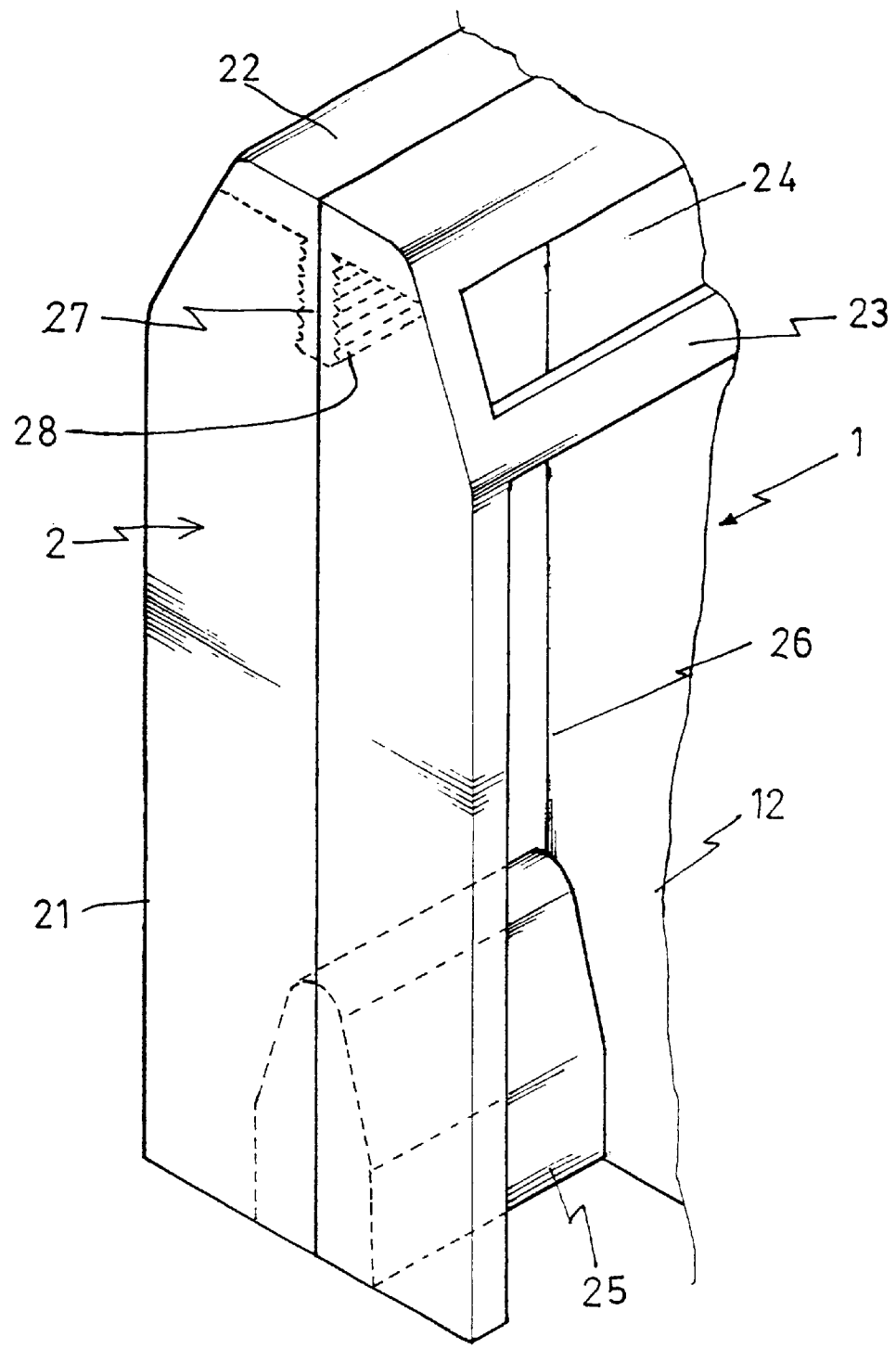
FIG. 2 is an enlarged partial perspective view of the portable booster battery device.
Figure 3:
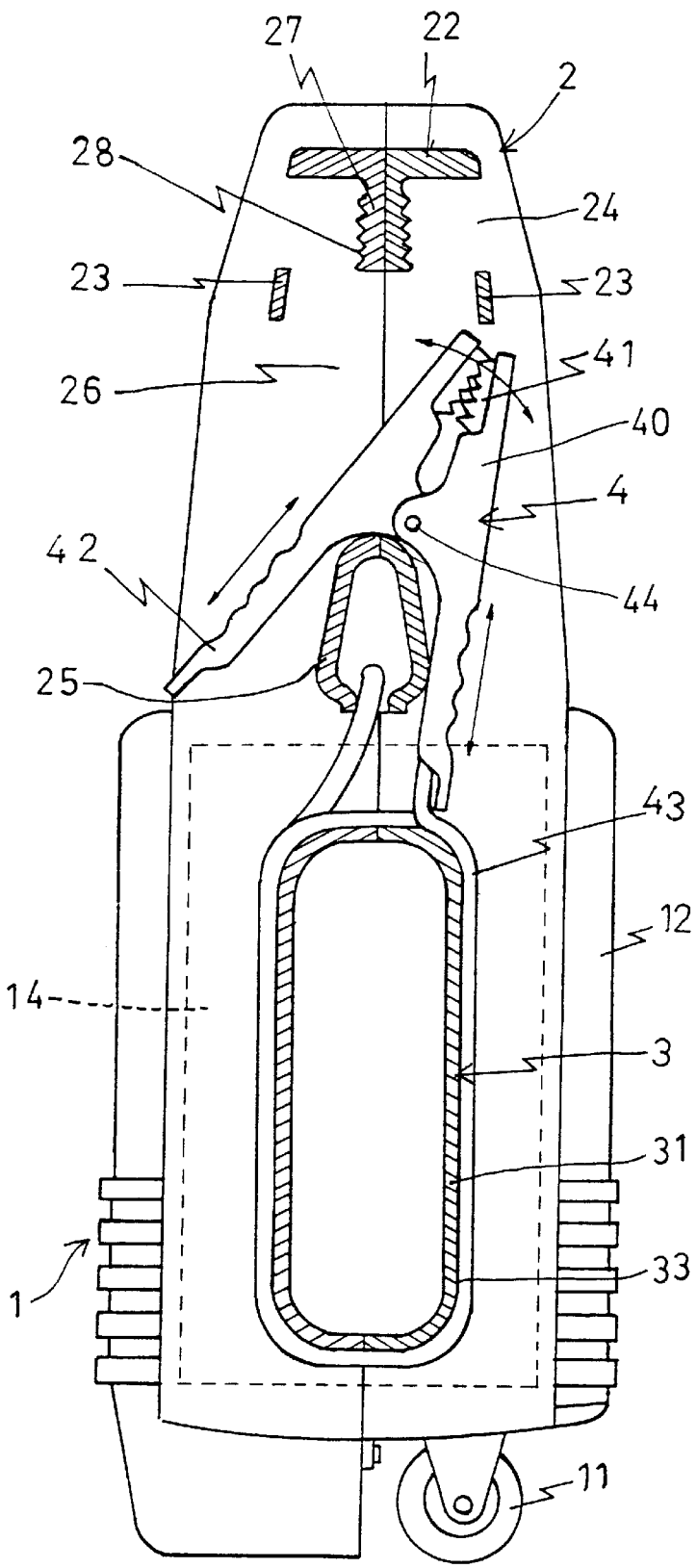
FIG. 3 is a cross sectional view taken along lines 3—3 of FIG. 1.

Referring to the drawings, and initially to FIGS. 1–3, a portable booster battery device 1 in accordance with the present invention comprises a housing 12 including one or more wheels 11 rotatably attached to the bottom of the housing 12 for allowing the portable booster battery device 1 to be easily carried by the users or moved to the other places. The housing 12 includes a hand grip 13 provided on top thereof for carrying the housing 12, and includes a chamber formed therein for receiving one or more batteries 14 therein, as shown in dotted lines in FIG. 3.

The housing 12 includes two sides each having a cable storage compartment 3 attached thereto. The cable storage compartments 3 each includes a shank, such as a hollow shank 31 attached to or extended from the sides of the housing 12 respectively, and each includes a plate 32 attached to the outer portion of the shanks 31 respectively for forming or defining a peripheral chamber 33 between the housing 12 and the shanks 31 and the plates 32 respectively and for receiving the cables 43 therein. The cables 43 may be wound around the shanks 31 for storing purposes, and are electrically coupled to the battery 14.

Two clips 4 are secured to the free ends of the cables 43 respectively, and each includes a pair of spring-biased levers 40 having a middle portion rotatably or pivotally secured together with a pivot pin 44. The levers 40 each includes a jaw 41 formed or provided on one end thereof for clipping or clasping purposes, and each includes a handle 42 formed or provided on the other end thereof for forcing the jaws 41 away from each other.

The portable booster battery device 1 further includes two protective apparatuses 2 attached to the sides of the housing 12 respectively for protecting the clips 4. The protective apparatuses 2 each includes an arm 21 parallel to the housing 12 and spaced away from the housing 12. The arms 21 each includes an upper portion having a beam 22 laterally extended therefrom and secured to the housing 12, such that the beams 22 may be formed or extended or secured between the upper portions of the arms 21 and the housing 12 respectively; and each includes a lower portion having a rod 25 laterally extended therefrom and secured to the housing 12, such that the rods 25 may be formed or extended or secured between the lower portions of the arms 21 and the housing 12 respectively.

The arms 21 each further includes two spaced bar 23 laterally extended from the upper or middle portion thereof and secured to the housing 12, such that the bars 23 may be formed or extended or secured between the upper or middle portions of the arms 21 and the housing 12 respectively, and such that an opening or a space 26 may be formed or defined between the bar 23, and the beam 22 and the rod 25 and the arm 21 respectively. The beams 22 each includes a stud 27 extended inward of the space 26 or extended toward the rod 25, or secured or extended between the arm 21 and the housing 12. The studs 27 each includes one or more teeth 28 formed on the outer portion thereof, for allowing the jaws 41 of the clips 4 to be solidly clasped onto the studs 27. A gap 24 is formed between the beam 22 or the stud 27 and the respective bar 23 for allowing the engagement of the clips 4 to the studs 27 to be seen through the gaps 24 that are formed between the beams 22 and the respective bars 23.

As best shown in FIG. 3, the distance between the bars 23 and the rod 25 is less than the length of the clip 4, such that one of the handles 42 of the levers 40 of the clip 4 may only be moved over the rod 25 when the clip 4 is tilted relative to the housing 12, and such that the clip 4 may be straddled over the rod 25 and may be engaged into the space 26 defined between the bar 23, and the beam 22 and the rod 25 and the arm 21 by tilting the clip 4 relative to the housing 12.

Figure 4:
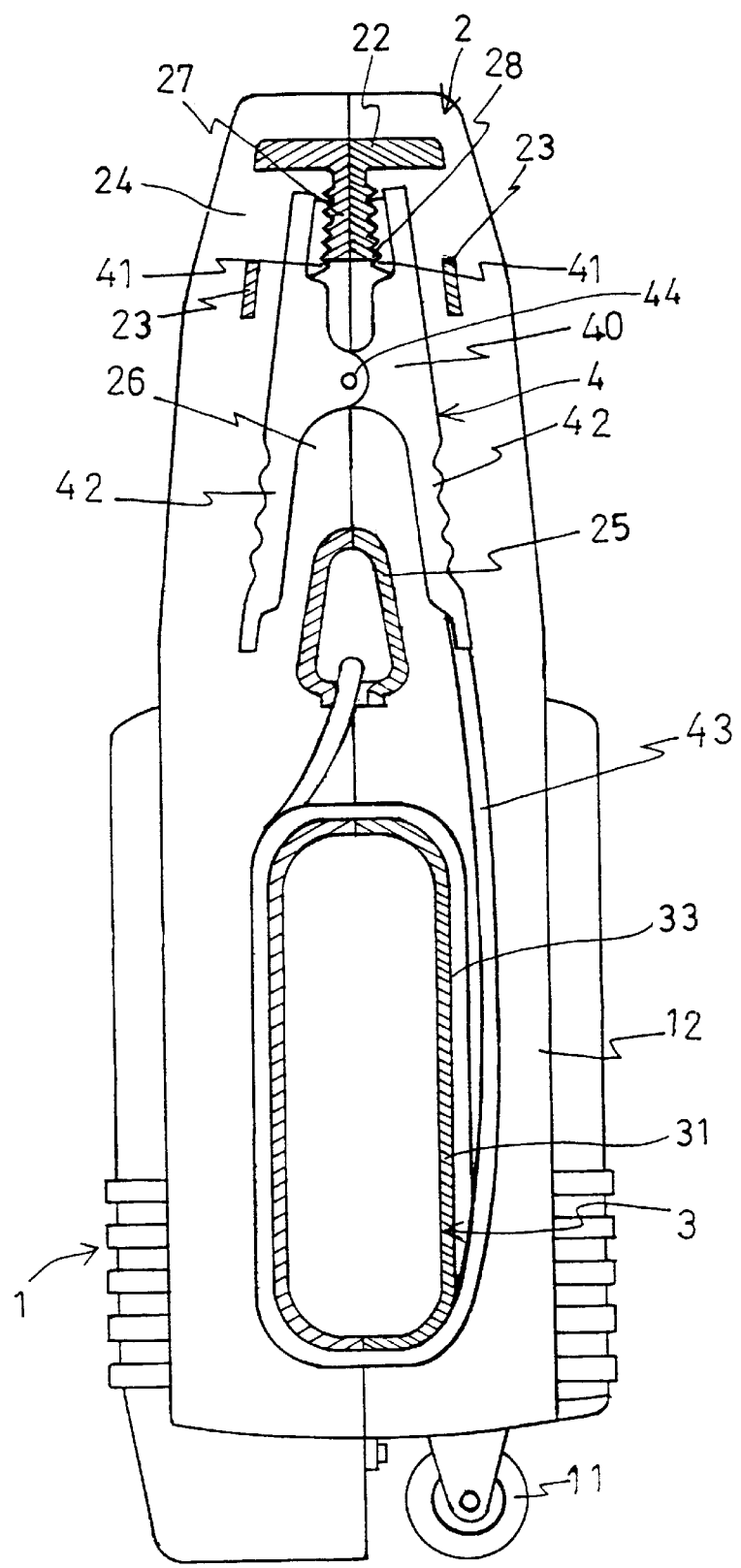
FIGS. 4 and 5 are cross sectional views similar to FIG. 3, illustrating the operation of the portable booster battery device.
Figure 5:
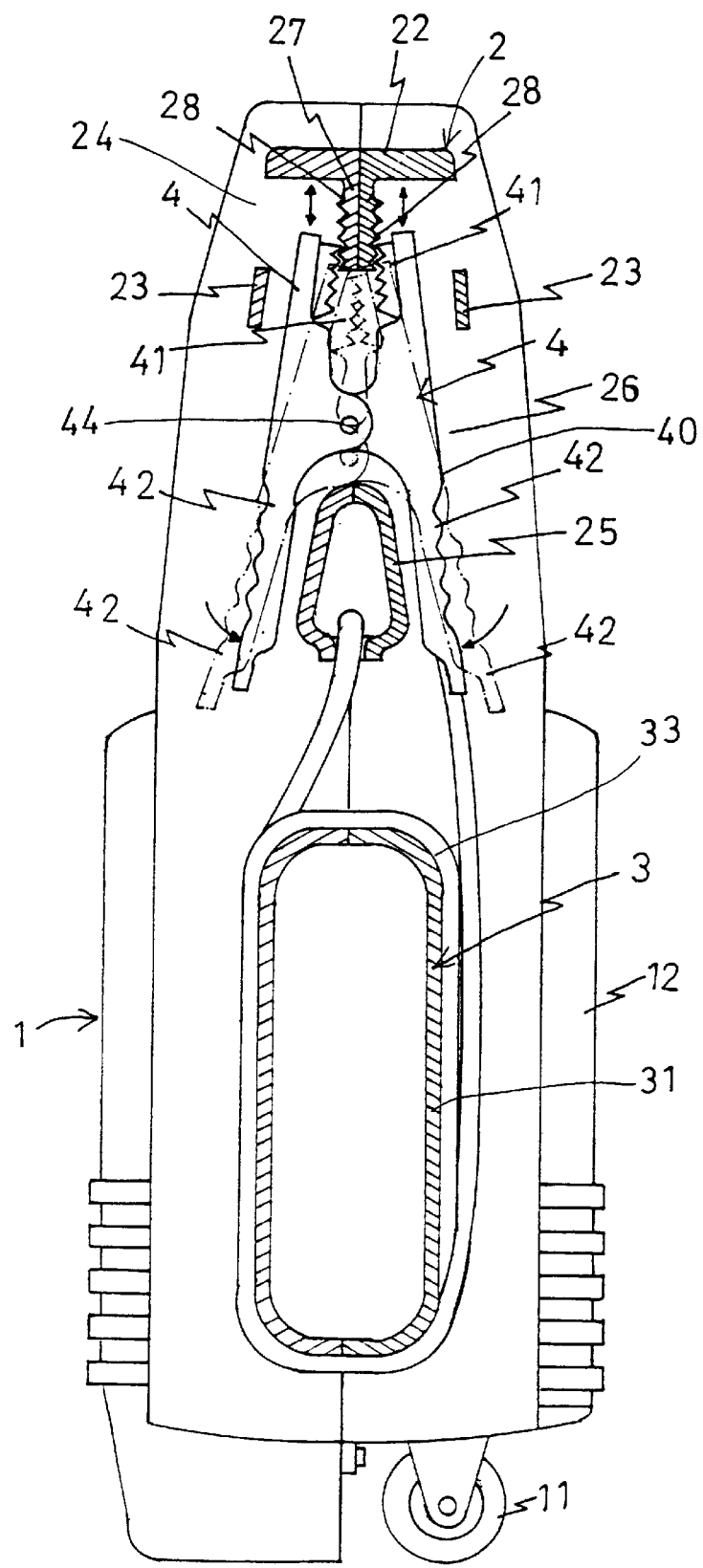

As shown in FIGS. 1, 4 and 5, the handles 42 of the clip 4 may be moved toward each other to separate the jaws 41 away from each other and to clasp the jaws 41 onto the stud 27, such that the clip 4 may be retained or disposed between the beam 22 and the rod 25. The attachment or the clasping of the jaws 41 to the stud 27 may be seen through the gaps 24 that are formed between the beams 22 and the respective bars 23. As shown in FIG. 5, when the jaws 41 of the clip 4 are disengaged from the stud 27 inadvertently, the rod 25 may also be engaged with the clip 4 and may retain the clip 4 to the housing 12, for preventing the clip 4 from being easily disengaged from the housing 12.

Accordingly, the portable booster battery device in accordance with the present invention includes a protective structure for preventing the clips from being disengaged from the housing after the clips are disengaged from the studs inadvertently.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A booster battery device comprising:

a housing including two sides, at least one battery engaged in said housing, two arms provided on said sides of said housing respectively, and each including an upper portion having a stud extended toward and secured to said housing, and each including a lower portion having a rod extended toward and secured to said housing, for forming a space between said arm and said stud and said rod respectively, two cables each including a first end electrically coupled to said at least one battery, and each including a second end, and two clips coupled to said second ends of said cables respectively, and each including a pair of jaws for clasping onto said studs respectively and for retaining said clips between said studs and said rods respectively, and for allowing said rods to support said clips when said clips are disengaged from said studs inadvertently.

2. The booster battery device according to claim 1, wherein said upper portions of said arms each includes a beam extended toward and secured to said housing, said studs are extended from said beams respectively.

3. The booster battery device according to claim 1, wherein said studs each includes at least one tooth provided thereon for allowing said clips to be stably clasped onto said studs.

4. The booster battery device according to claim 1, wherein said arms each includes a middle portion having a pair of spaced bars extended toward and secured to said housing, for further retaining and supporting said clips to said housing when said clips are disengaged from said studs inadvertently, said bars are spaced away from said studs for allowing a clasping of said jaws of said clips onto said studs to be seen through a gap formed between said bars and said studs.

5. The booster battery device according to claim 1, wherein said sides of said housing each includes a cable storage compartment provided therein for receiving said cables respectively.

6. The booster battery device according to claim 5, wherein said cable storage compartments each includes a shank extended from said side of said housing, and a plate secured to said shank for forming and defining a peripheral chamber between said shank and said plate and for receiving said cables respectively.

* * * * *